(12) United States Patent
Rockenfeller et al.

(10) Patent No.: US 9,228,750 B2
(45) Date of Patent: Jan. 5, 2016

(54) HVAC/R SYSTEM WITH MULTIPLE POWER SOURCES AND TIME-BASED SELECTION LOGIC

(75) Inventors: Uwe Rockenfeller, Boulder City, NV (US); Paul Sarkisian, Boulder City, NV (US); Kaveh Khalili, Boulder City, NV (US); Warren Harhay, Boulder City, NV (US)

(73) Assignee: ROCKY RESEARCH, Boulder City, NV (US)

( * ) Notice: Subject to any disclaimer, the term of this patent is extended or adjusted under 35 U.S.C. 154(b) by 1176 days.

(21) Appl. No.: 13/012,456

(22) Filed: Jan. 24, 2011

(65) Prior Publication Data

US 2012/0191253 A1 Jul. 26, 2012

(51) Int. Cl.
| | |
|---|---|
| *F25B 27/00* | (2006.01) |
| *F25B 49/00* | (2006.01) |
| *F24F 3/00* | (2006.01) |
| *F24F 11/00* | (2006.01) |
| *F24F 5/00* | (2006.01) |

(52) U.S. Cl.
CPC ............... *F24F 3/00* (2013.01); *F24F 11/0086* (2013.01); *F24F 2005/0067* (2013.01); *F24F 2011/0046* (2013.01); *F24F 2011/0047* (2013.01); *F24F 2011/0073* (2013.01); *F24F 2011/0075* (2013.01)

(58) Field of Classification Search
CPC .................... F24F 11/0086; F24F 2011/0047; F24F 2011/0073; F24F 2011/0075
USPC ............................................ 62/157, 231, 236
See application file for complete search history.

(56) References Cited

U.S. PATENT DOCUMENTS

| | | |
|---|---|---|
| 3,424,916 A | 1/1969 | Fenley |
| 4,006,603 A | 2/1977 | Miles |
| 4,340,823 A | 7/1982 | Miyazawa |
| 4,665,707 A | 5/1987 | Hamilton |
| 4,694,236 A | 9/1987 | Upadhyay et al. |
| 5,675,982 A | 10/1997 | Kirol et al. |
| 5,718,125 A | 2/1998 | Pfister et al. |

(Continued)

FOREIGN PATENT DOCUMENTS

| | | |
|---|---|---|
| EP | 0901218 A2 | 3/1999 |
| GB | 1287648 | 9/1972 |

(Continued)

OTHER PUBLICATIONS

Buchholz, Energy efficiency improvements in commercial cooling applications, Sanken Technical Report, 2002, vol. 34, Issue 1, pp. 47-50.

(Continued)

*Primary Examiner* — Jonathan Bradford
(74) *Attorney, Agent, or Firm* — Knobbe, Martens, Olson & Bear LLP

(57) ABSTRACT

A heating, ventilation, air conditioning, and refrigeration system includes one or more variable frequency drives (VFD) controlled by one or more VFD controllers, which are configured to provide three-phase power to one or more three-phase AC motors and single-phase power to one or more single-phase AC motors. The system also includes a power source controller configured to select from a plurality of power sources based on availability of one or more power sources and time so as to maximize the economic efficiency of operating the system.

27 Claims, 6 Drawing Sheets

(56) References Cited

U.S. PATENT DOCUMENTS

| | | | |
|---|---|---|---|
| 5,874,788 | A | 2/1999 | McCartney |
| 5,927,598 | A | 7/1999 | Broe |
| 5,929,538 | A | 7/1999 | O'Sullivan et al. |
| 5,977,659 | A | 11/1999 | Takehara et al. |
| 6,005,362 | A | 12/1999 | Enjeti et al. |
| 6,094,034 | A | 7/2000 | Matsuura |
| 6,242,883 | B1 | 6/2001 | Strunk |
| 6,257,007 | B1 | 7/2001 | Hartman |
| 6,304,006 | B1 | 10/2001 | Jungreis |
| 6,316,895 | B1 | 11/2001 | Ramarathnam |
| 6,471,013 | B2 | 10/2002 | Banno et al. |
| 6,639,373 | B2 | 10/2003 | Knight et al. |
| 6,813,897 | B1 * | 11/2004 | Bash ............... F25B 27/00 307/64 |
| 6,843,064 | B2 | 1/2005 | Khalili et al. |
| 6,847,130 | B1 | 1/2005 | Belehradek et al. |
| 7,151,328 | B2 | 12/2006 | Bolz et al. |
| 7,332,885 | B2 | 2/2008 | Schnetzka et al. |
| 2003/0048006 | A1 | 3/2003 | Shelter, Jr. et al. |
| 2003/0061828 | A1 * | 4/2003 | Blevins ..................... 62/236 |
| 2003/0101735 | A1 * | 6/2003 | Teague et al. ............... 62/70 |
| 2004/0046458 | A1 | 3/2004 | MacKay |
| 2004/0095091 | A1 * | 5/2004 | McNulty ............. H02J 1/10 320/101 |
| 2004/0245949 | A1 | 12/2004 | Ueda et al. |
| 2005/0006958 | A1 | 1/2005 | Dubovsky |
| 2006/0103342 | A1 | 5/2006 | Mechi |
| 2006/0208687 | A1 | 9/2006 | Takeoka et al. |
| 2007/0114962 | A1 | 5/2007 | Grbovic |
| 2008/0274683 | A1 * | 11/2008 | Burdett et al. ............... 454/61 |
| 2009/0178421 | A1 * | 7/2009 | Yeh ............... F25B 49/025 62/132 |
| 2009/0277196 | A1 * | 11/2009 | Gambiana et al. ........... 62/115 |
| 2009/0293523 | A1 * | 12/2009 | Bittner et al. ............... 62/236 |

FOREIGN PATENT DOCUMENTS

| | | |
|---|---|---|
| GB | 2354378 A | 3/2001 |
| JP | 4-364372 | 12/1992 |
| JP | 5-157330 | 6/1993 |
| JP | 5-324106 | 12/1993 |
| JP | 9-168299 | 6/1997 |
| JP | 2005-210869 | 8/2005 |
| JP | 2008-048568 | 2/2008 |
| WO | WO 98/02695 A2 | 1/1998 |
| WO | WO 2005/020407 A2 | 3/2005 |

OTHER PUBLICATIONS

Holtz et al., A high-power multitransistor-inverter uninterruptable power supply system, IEEE Transactions on Power Electronics, Jul. 1988, vol. 3, Issue 3, pp. 278-285.

Mallinson, "Plug and play" single chip controllers for variable speed induction motor drives in white goods and HVAC systems, Thirteenth Annual Applied Power Electronics Conference and Exposition, Feb. 19, 1998, vol. 2, pp. 756-762.

Manz, Applying adjustable speed drives (ASDs) to 3 phase induction NEMA frame motors, Proceedings of 38th Cement Industry Technical Conference, Apr. 14, 1996, pp. 71-78.

Matsui et al., Improvement of transient response of thermal power plant using VVVF inverter, International Conference on Power Electronics and Drive Systems, Nov. 27, 2007, pp. 1209-1214.

Meenakshi et al., Intelligent controller for a stand-alone hybrid generation system, 2006 IEEE Power India Conference, Apr. 10, 2006, pp. 8.

Muntean et al., Variable speed drive structures and benefits in cooling tower fans applications, Dept. of Electr. Eng., Univ. Politehnica of Timisoara, Romania WSEAS Transactions on Systems, Apr. 2007, vol. 6, Issue 4, pp. 766-771.

Nelson et al., Basics and advances in battery systems, IEEE Transactions on Industry Applications, Mar. 1995, vol. 31, Issue 2, pp. 419-428.

Prest et al., Development of a three-phase variable speed drive system for a battery fed underground mining locomotive, Third International Conference on Power Electronics and Variable-Speed Drives, Jul. 13, 1988, pp. 233-236.

Stefanovic, Adjustable speed drives: Applications and R&D needs; Department of Energy, Washington, DC. Report No. ORNL/SUB-80-SN772, Sep. 1995.

Sukumara et al., Fuel cell based uninterrupted power sources, International Conference on Power Electronics and Drive Systems, May 26, 1997, vol. 2, pp. 728-733.

Suryawanshi et al., High power factor operation of a three-phase rectifier for an adjustable-speed drive, IEEE Transactions on Industrial Electronics, Apr. 2008, vol. 55, Issue 4, pp. 1637-1646.

Thoegersen et al., Adjustable Speed Drives in the Next Decade: Future Steps in Industry and Academia, Electric Power Components and Systems, 2004, vol. 32, Issue 1, pp. 13-31.

Tolbert et al., A bi-directional DC-DC converter with minimum energy storage elements, Conference Record of the Industry Applications Conference, 2002., Oct. 13, 2002, vol. 3, pp. 1572-1577.

Tracy et al., Achieving high efficiency in a double conversion transformerless UPS, IECON 2005, Nov. 6, 2005, pp. 4.

Welchko et al., A novel variable frequency three-phase induction motor drive system using only three controlled switches, Thirty-Fifth IAS Annual Meeting and World Conference on Industrial Applications of Electrical Energy, Oct. 8, 2000, vol. 3, pp. 1468-1473.

Yang et al., An improved assessment model of variable frequency-driven direct expansion air-conditioning system in commercial buildings for Taiwan green building rating system, Taiwan Building and environment, 2007, vol. 42, Issue 10, pp. 3582-3588.

Yuan et al., Integrated uninterruptible DC converter with low input distortion and wide regulation capability, Fifth International Conference on Power Electronics and Variable-Speed Drives, Oct. 26, 1994, pp. 638-644.

Zhan et al., Development of a single-phase high frequency UPS with backup PEM fuel cell and battery, International Conference on Electrical Machines and Systems, Oct. 8, 2007, pp. 1840-1844.

* cited by examiner

HVAC/R SYSTEM WITH MULTIPLE POWER SOURCES AND TIME-BASED SELECTION LOGIC

BACKGROUND OF THE INVENTION

Heating, ventilation, air conditioning, and refrigeration (HVAC/R) systems, such as those used in residential buildings, commercial buildings, and remote locations are generally powered by alternating current (AC) power received from an AC utility power source, such as an AC grid power. In some areas, the cost of AC grid power varies throughout the day and night based on load. Generally, higher power costs occur during the hours of greatest demand. In the hottest seasons of the year, power demands are usually highest in the late afternoon and early evenings when more HVAC/R systems are in use. In coldest seasons of the year, heating demands are highest in the mornings and evenings. Thus, power demands and costs may vary by time of day and time of year.

SUMMARY OF THE INVENTION

A heating, ventilation, air conditioning, and refrigeration (HVAC/R) system may be configured to draw power from a plurality of available power sources so as to minimize the overall cost of operating the HVAC/R system. Power sources may include: AC grid power, photovoltaic power sources, portable electromechanical generators, direct current (DC) sources, such as batteries, and other sources. Alternate power sources, such as DC power sources comprising one or more batteries, may provide sufficient power for continued operation of HVAC/R system when the primary power source, such as AC grid power, is more expensive, or when AC power capacity is insufficient or unavailable. Additionally, the system has a power source controller with integral logic for selecting a power source based on availability and time data.

In one embodiment, an HVAC/R system includes: an AC power source; a DC power source configured to provide power to the HVAC/R system; one or more three-phase motors; one or more single-phase motors; a variable frequency drive (VFD) electrically connected to the AC power source and the DC power source and configured to provide three-phase power to the three-phase motor and single-phase power to single-phase motor; and a controller communicating with the AC power source and the DC power source, wherein the controller further comprises a 24-hour clock and is configured to monitor AC power source capacity, DC power source capacity, and to reduce AC power supplied during selected clock times.

In another embodiment, an air conditioning system includes: a condenser; one or more evaporators; an AC power source; a DC power source configured to selectively provide power to the air conditioning system; a VFD electrically connected to the DC power source and configured to provide power to a variable speed condenser motor; a pulsed operation refrigerant flow control valve configured to control refrigerant flow to the one or more evaporators; and a controller communicating with the AC power source and the DC power source, wherein the controller additionally comprises a 24-hour clock and is configured to monitor AC power capacity, the charge status of the DC power source, and to reduce AC power supplied during selected clock times.

In a further embodiment, a method in an air conditioning system of cooling air includes: providing a power system that switches from AC power to back-up battery power in the absence of AC power and/or during selected hours and/or during peak loads on AC power source; electronically controlling the speed of a condenser motor when the air conditioning system is on back-up battery power in order to increase air cooling efficiency; and controlling the flow of the refrigerant within the air conditioning system with a pulsed operation refrigerant flow control valve.

In yet another embodiment, a system for powering an HVAC/R system includes: a DC power bus; a plurality of power sources; a variable frequency drive; means for storing DC power electrically connected to the DC power bus; means for controlling a variable frequency drive electrically connected to the DC power bus; means for selecting from a plurality of power sources and providing electric power to the variable frequency drive, electrically connected to the DC power bus; and means for generating time data electrically connected to the means for selecting from a plurality of power sources and providing electric power to the variable frequency drive.

In an additional embodiment, a method for controlling an HVAC/R power supply system includes: receiving data indicating a capacity of an AC power source; receiving data indicating a capacity of a DC power source; receiving data indicating an electric load of an HVAC/R system; receiving time data; selecting an available power source from a plurality of power sources based on the relative cost of the selected power source as compared to other available power sources; and instructing the VFD controller to draw power from the selected power source.

DETAILED DESCRIPTION

Figure 1:
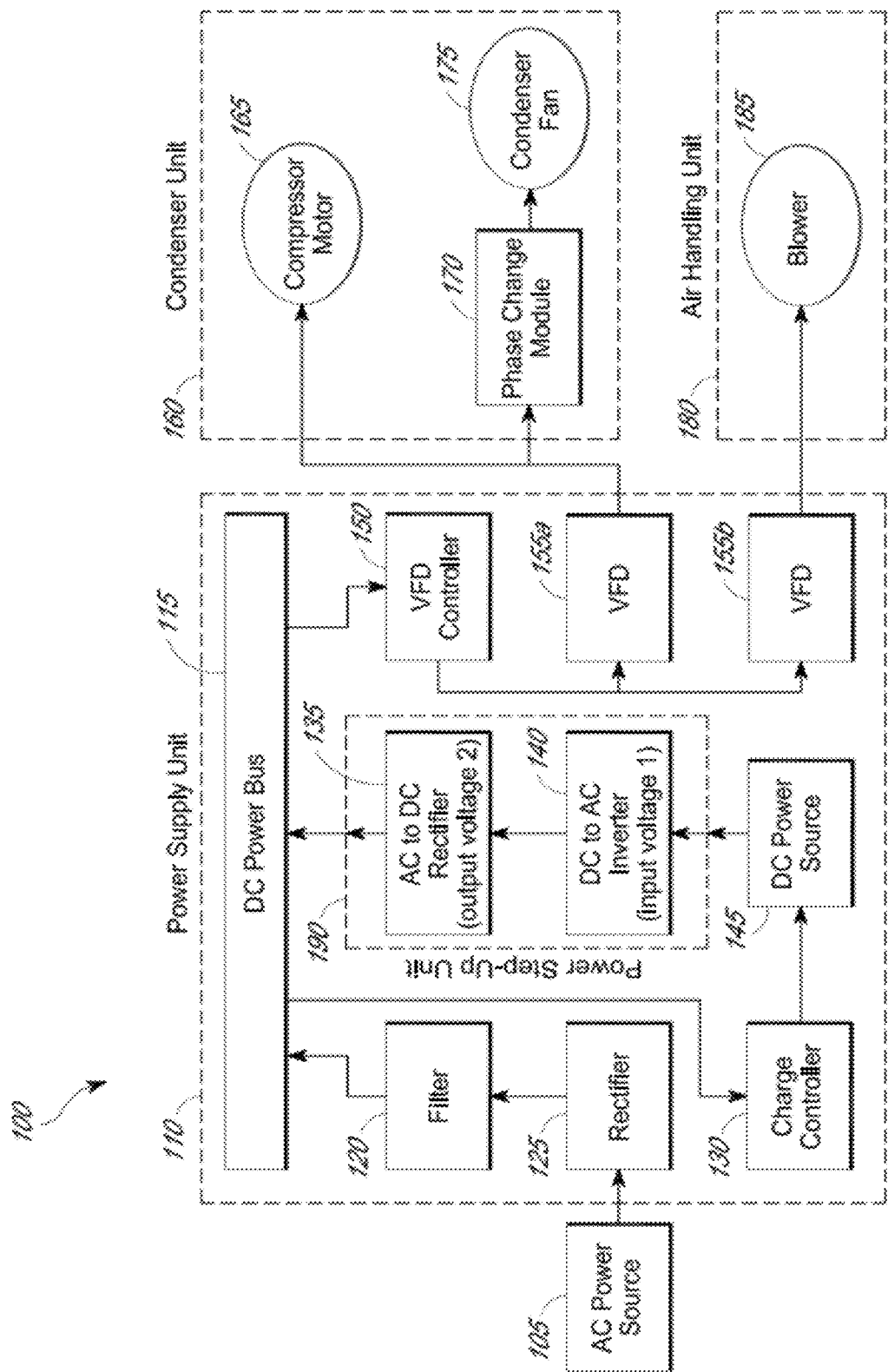
FIG. 1 is a schematic block diagram illustrating an embodiment of an HVAC/R power supply system with a rechargeable DC power back-up.

One embodiment relates to a heating, ventilation, air conditioning, and refrigeration (HVAC/R) system for controlling the temperature within an enclosure, such as a residential home, commercial building or remote installation. In this embodiment, the HVAC/R system is powered by alternating current (AC) power from a power grid under normal conditions, but is also connected to one or more alternate power sources, such as a photovoltaic power source and a direct current (DC) power source, such as a battery. The HVAC/R system is run using one or more three-phase motors and one or more single phase motors in order to provide heating and cooling most efficiently. In order to increase efficiency, one or more variable frequency drives (VFD) are provided, which may be configured to provide three-phase power to the three-phase motors and single-phase power to the single phase motors. In one embodiment, the AC power is first converted to DC power in order to power the VFD.

Three-phase motors, such as compressor motors within an HVAC/R system, may be operated much more efficiently and with less wear if the character of the power running them is controllable. For example, in one embodiment, when starting a three-phase electric motor, the frequency of the driving power can be modulated to avoid transient current spikes and unnecessary wear on the motor. VFDs are able to receive DC power and output modulated (i.e. frequency controlled) AC power to electric motors. By varying the frequency of the power to an electric motor, a VFD can more efficiently control the speed of that electric motor. The system described herein can utilize VFDs in an HVAC/R system to increase the efficiency of the system by providing control of the speed and output of the HVAC/R system components. For example, if a temperature controlled environment needs slight cooling, it is more efficient to run the HVAC/R system components, such as the compressor motor, at a reduced speed to meet the actual need, rather than to run it at full speed. Being able to modulate the speed of HVAC/R components such as those mentioned above also prevents unnecessary cycling of the system and allows for more fine control of the environment as a whole.

Because of the variety of different HVAC/R system components and their individual power requirements, it is often advantageous to provide more than one VFD in an HVAC/R system. Further, a VFD controller may be provided to provide overall control of the multiple VFDs to maximize HVAC/R system performance and efficiency.

Traditional AC power sources, such as AC grid power, may have variable cost per power unit (e.g. per kilowatt-hour) during different times of the day and of the year. Moreover, AC grid power can be unreliable depending on the location of the power supply need, the weather, and other variables.

Photovoltaic power sources generate electrical power by converting solar radiation into DC power using semiconductors that exhibit the photovoltaic effect i.e. the creation of a voltage (or a corresponding electrical current) in a material upon exposure to solar radiation. Photovoltaic power sources are often constructed as panels comprising a number of cells, which contain a photovoltaic material. Examples of materials presently used for photovoltaic power sources include: monocrystalline silicon, polycrystalline silicon, amorphous silicon, cadmium telluride, and copper indium selenide/sulfide. Photovoltaic power sources often include several components such as a panel comprising many individual photovoltaic cells, an inverter, which converts the generated DC current to AC current, batteries connected to the panels to store excess generated electricity, charge controllers which control the charge going to any connected batteries, and sensors which monitor the output of the photovoltaic power source.

Thus, one embodiment is an HVAC/R power supply system that includes a power source controller, which can select from a plurality of power sources based on, for example, availability, instant cost per power unit of each of the available power sources, and time of day. A power source controller, which may be standalone or built into another HVAC/R component such as a VFD controller, can increase the overall system efficiency by precisely controlling the source of the power for the HVAC/R components when multiple sources are available. This embodiment also includes a clock, which may provide time of day and time of year data. Furthermore, this embodiment may provide uninterrupted power to the HVAC/R system components regardless of the status of the AC power source. Such an embodiment may include a photovoltaic power source and a DC power source, such as a DC battery, both of which may be selected individually or in combination to power the HVAC/R system in a cost-efficient manner. Alternatively, the photovoltaic power source and the DC power source may be used alone or in combination to supplement the power available to the HVAC/R system when, for example, the AC power capacity is insufficient to meet HVAC/R system load.

FIG. 1 is a schematic block diagram illustrating an embodiment of an HVAC/R power supply system 100 with a DC power source 145, as well as components of an HVAC/R system. The AC power source 105 provides AC power from, for example, AC grid power. The AC power source 105 is electrically connected to a rectifier 125. A rectifier is an electrical device that converts AC power, which periodically reverses direction, to DC power, where the current flows in only one direction. Rectifiers may be made of solid state diodes, vacuum tube diodes, mercury arc valves, and other components as are well known in the art. In some embodiments, the rectifier 125 includes an integral transformer capable of varying the AC input voltage from, for example, AC power source 105, to an alternate output voltage. A rectifier embodiment with integral transformer is described in more detail with respect to FIG. 2, below. In a preferred embodiment, a filter 120 (or smoothing circuit) is electrically connected to the output of the rectifier in order to produce steady DC current from the rectified AC power source 105. Many methods exist for smoothing the DC current including, for example, electrically connecting a reservoir capacitor or smoothing capacitor to the DC output of the rectifier 125. The filter 120 is also electrically connected with the DC power bus 115 to provide filtered DC power to other HVAC/R power supply system 100 components.

The DC power bus 115 electrically connects to components of the HVAC/R power supply system 100 to provide electric power to those components. The DC power bus 115 may include one or more conductors, such as wires or cables, capable of conducting and transmitting electric power and other electrical signals. The DC power bus 115 may be a multi-wire loom with physical connectors so that the bus may be connected to components and expanded to meet the power needs of the HVAC/R power supply system 100. Certain embodiments of a DC power bus may comprise sub-buses that are at different voltages, such as a high-voltage DC sub-bus and a low-voltage DC sub-bus. In this way, a single DC power bus can provide DC power at different voltage levels in accordance with the needs of distinct components connected to the DC power bus 115. In this embodiment, the DC power bus 115 electrically connects to the DC power source 145 so that it may be recharged. The DC power source 145 may be, for example, a battery, or a plurality of batteries electrically connected to each other. If multiple batteries are used, they may be connected in series or in parallel to produce resultant voltages different from the voltage of the individual battery units. As pictured in FIG. 1, to limit the amount of charge current flowing to the DC power source 145, a current limiting circuit or battery charge controller 130 may be placed between the power bus 115 and the DC power source 145. The charge controller 130 limits the current charging the DC power source 145 according to the specification of the DC power source 145 so that it is not damaged while being charged. Additionally, the battery charge controller 130 may condition the DC power source 145 for longer lasting operation.

The DC power source 145 may include one or more batteries, such as automobile batteries. Typically, such batteries have relatively low voltages, such as 12 volts or 24 volts. While it may be possible to increase the voltage by wiring the batteries in series, it may be preferable to have fewer batteries or a lower voltage DC power source 145. Accordingly, the DC power source 145 may be connected to a power step-up unit 190. Stepping-up voltage may be accomplished by a DC to DC conversion utilizing a DC to AC inverter. A DC to AC inverter is an electrical device that converts DC power to AC power. The resulting AC current can be at any voltage and frequency with the use of appropriate transformers, switching, and control circuits, as is well known in the art. Inverters are commonly used to supply AC power from DC sources such as solar panels or batteries. In FIG. 1, DC power source 145 is a low voltage power source, such as a 12 volt automobile battery. The DC power source 145 is electrically connected to power step-up unit 190, which includes DC to AC inverter 140. The inverter 140 converts the low voltage current from the DC power source 145 to a higher voltage output AC current. Power step-up unit 190 also includes a rectifier 135. The inverter 140 is electrically connected to rectifier 135, which converts the high voltage AC current back to DC current, but at a higher voltage than the original DC power source 145 voltage. For example, 12 volt current from DC power source 145 may be converted to 300 volt DC current using the power step-up unit 190. An embodiment of a power step-up unit is described further with reference to FIG. 3, below. The power step-up unit 190 is also connected to the DC power bus 115 to supply high voltage DC power to HVAC/R system components. The same process can also be used to step-down the voltage of the DC power source 145, where, for example, the DC power source is a high voltage source and low voltage DC is needed. The process for stepping-down the voltage would be the same, except the step of inverting the DC current to AC would lower rather than raise the voltage of the supplied current.

AC power may also be selectively stepped-up or down by use of a transformer, which is a device that transfers electrical energy from one circuit to another through inductively coupled conductors. A varying current in the first or primary conductor creates a varying magnetic flux in the transformer's core and thus a varying magnetic field through the secondary conductor. This varying magnetic field induces a voltage in the secondary conductor. If a load is connected to the secondary conductor, an electric current will flow in the secondary conductor and electrical energy will be transferred from the primary circuit through the transformer to the load. By appropriate selection of the ratio of turns in each conductor, a transformer my selectively step-up or step-down AC voltage.

The DC power bus 115 is also electrically connected to a Variable Frequency Drive (VFD) controller 150. The VFD controller 150 is electrically connected to the VFDs 155*a* and 155*b* and comprises electronics which provide power and control signals to the VFDs to, for example, turn them on or off, or to modulate their drive frequencies during operation. The VFD controller 150 may receive signals from sensors (not shown), such as temperature sensors and may include other programmed logic for the control of the VFDs 155*a* and 155*b*. The VFD controller 150 may also receive signals from a device that generates time data, such as a clock apparatus (not shown), or may have integral software or hardware, or combinations thereof, to create time data. In other embodiments, the VFD controller 150 may comprise a fixed control panel (not shown) mounted in a remote location and operable to control the VFDs manually. The VFD controller 150 may also monitor the current load on the power bus 210 and vary the current draw of the VFDs (155*a* and 155*b*) to avoid any dangerous over-current condition. In alternative embodiments, the VFD controller 150 may require AC power, and so it may be electrically connected to an inverter (not shown) electrically connected to the DC power bus 115. In yet another embodiment, a VFD may provide AC power to a controller (not shown) that requires AC operating power. In a further embodiment, the VFD controller may receive AC power directly from the AC power source 105. The VFD controller 150 may comprise a microprocessor or computing system including software and hardware configured to accomplish the aforesaid operations.

Each VFD controls the rotational speed of an AC electric motor, such as compressor motor 165 and blower 185. The VFD controls the speed of the motor by controlling the frequency of the electrical power supplied to the motor, as is well known in the art. VFDs are sometimes alternatively referred to as adjustable-frequency drives (AFD), variable-speed drives (VSD), AC drives, microdrives or inverter drives. Since the voltage is varied along with frequency, these are sometimes also called variable voltage variable frequency (VVVF) drives. In the embodiment shown in FIG. 1, there are multiple VFDs (155*a* and 155*b*) electrically connected to separate components of the HVAC/R system. Because different elements of the HVAC/R system, such as the compressor motor 165 and the blower 185 may have different operational requirements, such as optimal speed and current draw, it is convenient to provide multiple VFDs to address those electrical requirements separately; however, multiple VFDs are not necessary. Further, VFDs are preferred because they can vary the speed of different motor elements according to HVAC/R system needs. For example, when the HVAC/R system is in a cooling mode wherein the cooling requirements are minimal, the VFDs can lower the speed of the blower 185 as well as reducing the speed of the compressor motor 165 to accommodate for the reduced cooling needs. This not only reduces overall power consumption advantageously, but it reduces unnecessary wear on HVAC/R system components. A VFD, such as VFD 155*a*, may also be electrically connected to a phase change module 170, which is then electrically connected to another HVAC/R element, such as condenser fan 175. In this embodiment, the condenser fan 175 has a single-phase motor which is not compatible with the multi-phase output of VFD 155*a*, which is necessary for the compressor motor 165 on the same circuit. However, because the compressor motor 165 and condenser fan 175 typically operate at the same time, it is convenient to have current provided to both by VFD 155*a*. The phase change module 170 adapts the multi-phase VFD output current to a single-phase current to operate the condenser fan 175 efficiently. In certain embodiments, the phase change module 170 may comprise a plurality of capacitors in series and at least one capacitor in parallel with the plurality of capacitors in series. In other embodiments, the VFDs are electrically connected to the DC power bus 115 and are controlled individually by, for example, local control panels, without the need for VFD controller 150.

Figure 2:
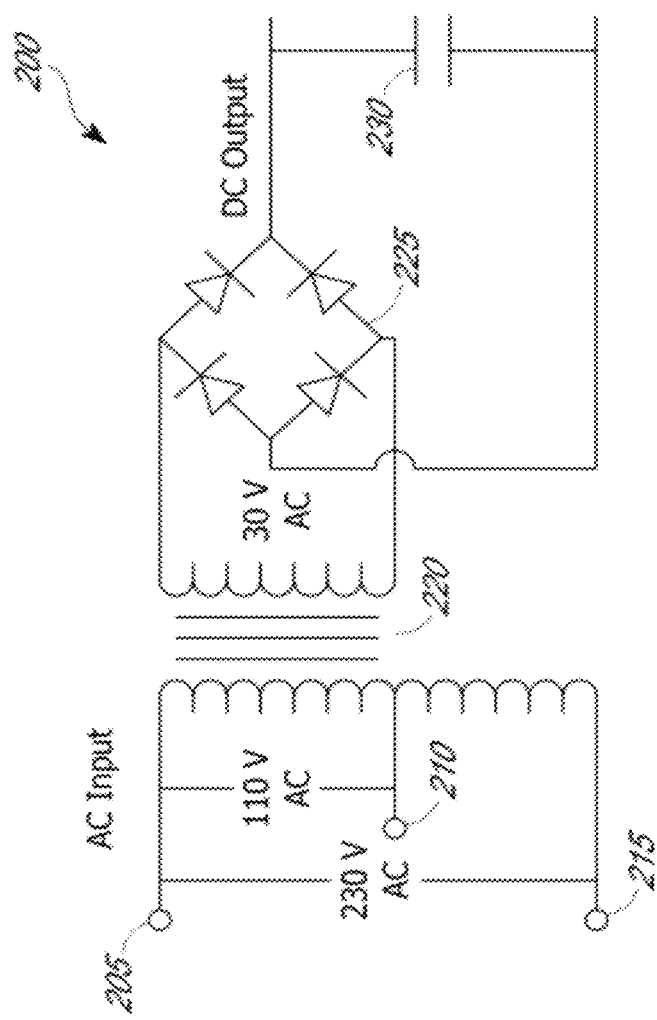
FIG. 2 is a schematic diagram illustrating an embodiment of an integrated rectifier.

FIG. 2 is a schematic diagram illustrating an embodiment of an integrated rectifier 200. The Rectifier 200 includes an integral transformer 220, rectifier circuit 225, and filter 230. In this embodiment, the rectifier 200 is capable of receiving both a 230 volt AC signal and a 110 volt AC signal, and is configured to produce a 30 volt DC output signal. A low voltage DC signal may be used for charging a DC power source (not shown). Accordingly, in some embodiments, a rectifier such as rectifier 200 can be directly, electrically connected to a DC power source, such as a battery, such that the low voltage DC output can charge the DC power source. The transformer 220 includes three taps 205, 210 and 215 on the input side. To produce a 110 volt AC signal, the top two taps, 205 and 210, are electrically connected to the transformer 220. Alternatively, to produce a 230 volt AC signal, the two outermost taps, 205 and 215, are electrically connected to the transformer 220. The transformer 220 steps down the input voltage to produce a lowered output voltage for the rectifier circuit 225. In this embodiment, the rectifier circuit 225 is a four diode bridge rectifier. Other rectifier configurations may be used. The filter 230 then smoothes the DC output signal from the rectifier circuit 225. As shown in FIG. 2, the filter 230 is a single capacitor. In other embodiments, alternative filters may be used as are known in the art.

Figure 3:
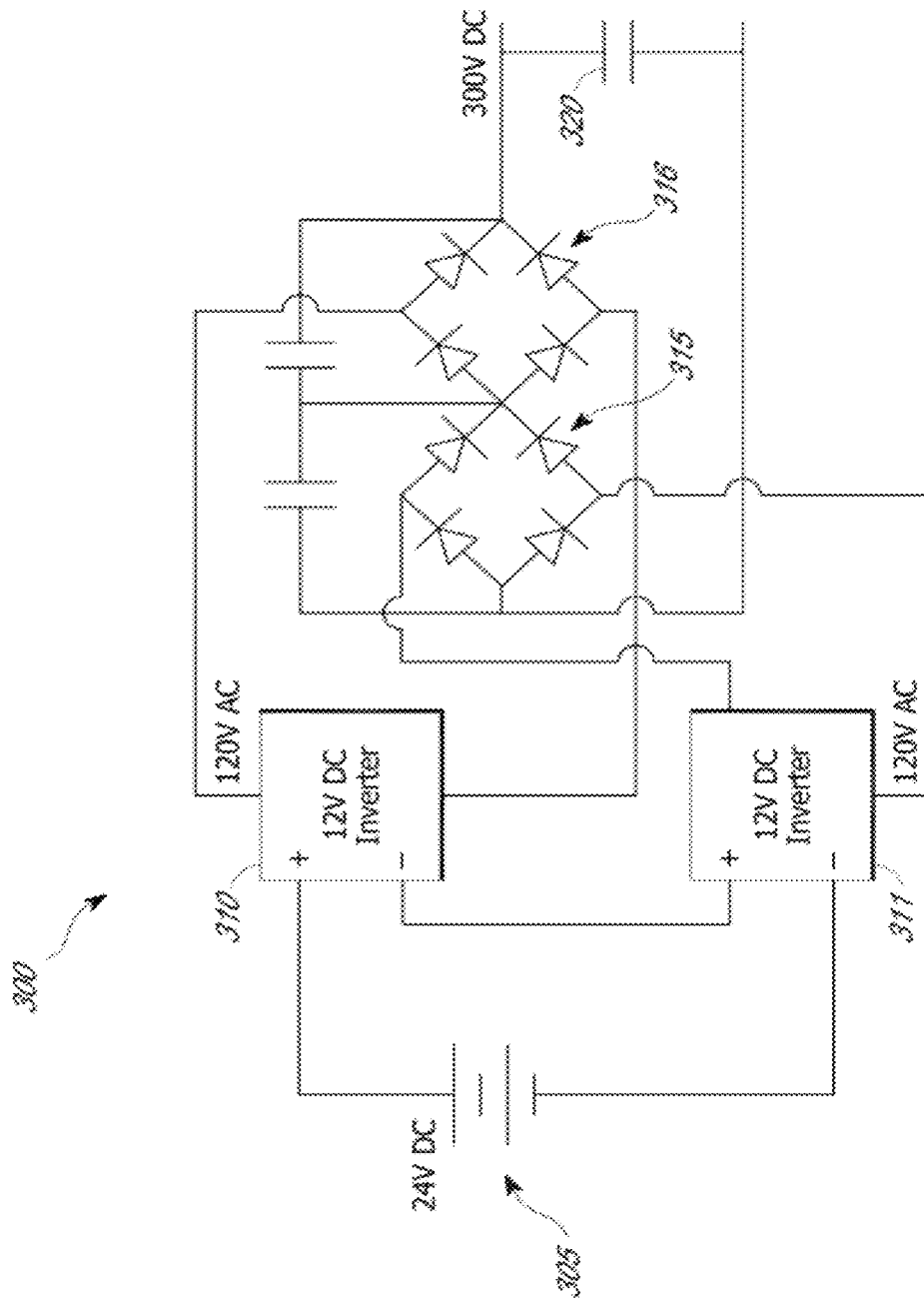
FIG. 3 is a schematic diagram illustrating an embodiment of a power step-up unit.

FIG. 3 is a schematic diagram illustrating an embodiment of a power step-up unit, such as power step-up unit 190 of FIG. 1. Power step-up unit 300 includes two 12 volt DC to 120 volt AC inverters, 310 and 311, rectifiers 315 and 316, and filter 320. Power step-up unit 300 receives a 24 volt DC power signal from a DC power source 305, such as a battery, or series of batteries, and outputs 300 volt DC power. The two inverters 310 and 311 are each configured to receive a 12 volt DC input and output a 120 volt AC signal. The rectifiers 315 and 316 rectify the respective AC signals producing DC outputs of about 150 volts each. The rectifiers 315 and 316 are connected in serial, and therefore collectively produce a combined DC signal of about 300 volts. In the embodiment shown in FIG. 3, the rectifiers 315 and 316 are each a four diode bridge rectifier in parallel with a capacitor. Other rectifier configurations may be used. Additionally, a filter 320 is connected across the rectifier outputs. The filter 320 is configured to improve the quality of the DC output signal. As shown in FIG. 3, the filter 320 is a single capacitor. In other embodiments, alternative filters may be used as are known in the art.

Figure 4:
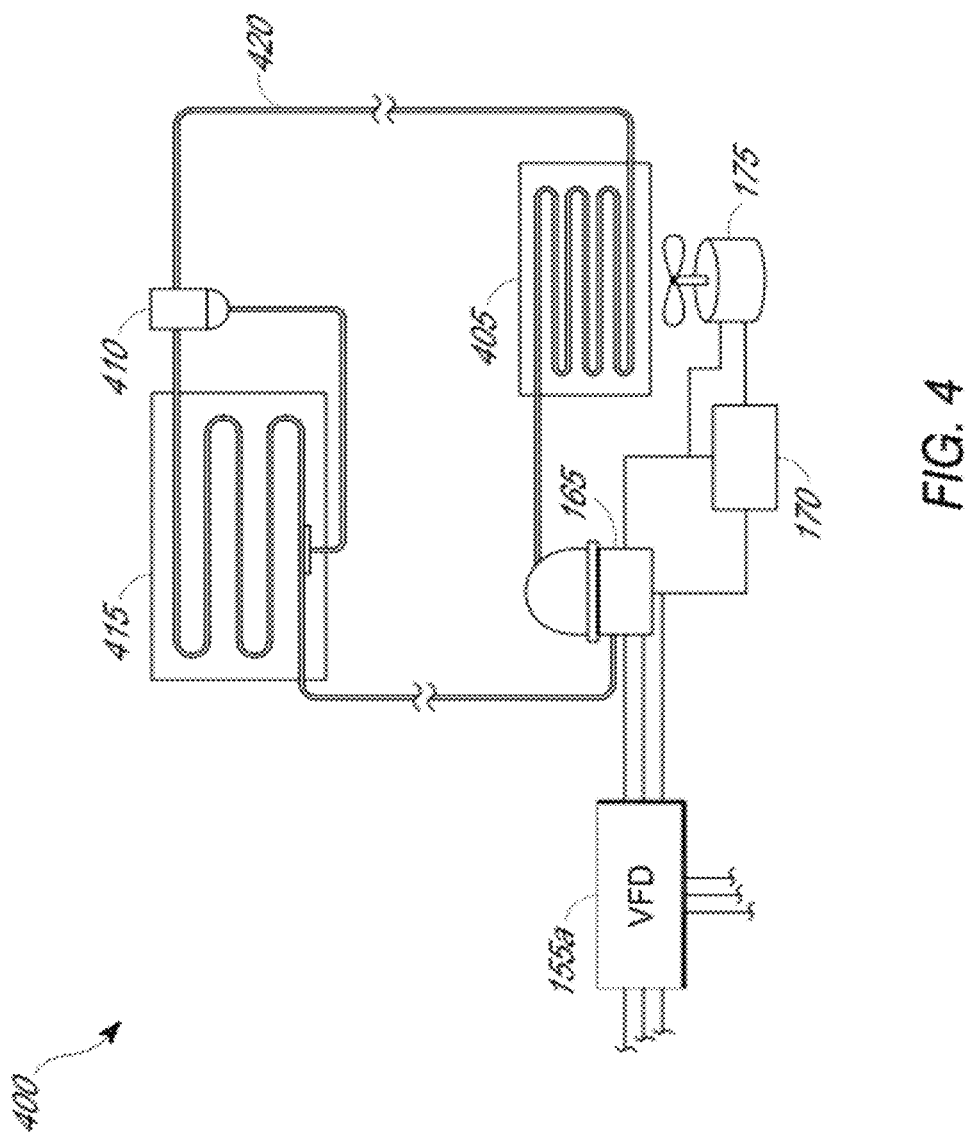
FIG. 4 is a schematic illustration of elements of an HVAC/R system, including a pulsed control valve.

FIG. 4 is a schematic illustration of elements of an HVAC/R system 400, including a pulsed control valve 410. Refrigerant is circulated in the system via the refrigerant lines 420. The compressor motor 165 compresses refrigerant circulated in the refrigerant lines 420 and then passes it to the condenser 405, where the compressed refrigerant is cooled and liquefied. The condenser fan 175 assists with the cooling of the compressed refrigerant by forcing air over cooling fins (not shown) attached to the condenser 405. The compressor motor 165 is electrically connected to a VFD 155*a*, which provides three-phase AC power to it. The VFD 155*a* is additionally electrically connected to a phase change module 170, which converts the three-phase AC power to single-phase AC power for the condenser fan 175. Collectively, the compressor motor 165, the condenser 405, the condenser fan 175 and the phase change module 170 make up the condenser unit 160 of FIG. 1. After the refrigerant is cooled and condensed in the condenser unit 405, it is passed to the pulsed control valve 410.

The pulsed control valve 410 controls refrigerant flow from the condenser 405 to the evaporator 415. Conventional evaporators are designed to operate at full refrigerant flow and are inefficient at lower flows, and fluctuating flows. However, the VFD powered compressor motor 165 may result in variable refrigerant flows to the condenser and to the evaporator as the drive frequency is modulated according to system cooling needs. In order to achieve optimal system performance, the pulsed control valve 410 is used to produce an optimal refrigerant flow regardless of the action of the VFD 155*a*. Such refrigerant control is especially important at lower refrigerant flow rates resulting from variable compressor speeds. The pulsed control valve 410 may be a mechanical valve such as described in U.S. Pat. Nos. 5,675,982 and 6,843,064 or an electrically operated valve of the type described in U.S. Pat. No. 5,718,125, the descriptions of which are incorporated herein by reference in their entireties.

The evaporator 415 evaporates the compressed refrigerant thereby extracting heat from the air around it. The evaporator 415 may additionally have metal fins (not shown) to increase its heat exchanging efficiency.

Figure 5:
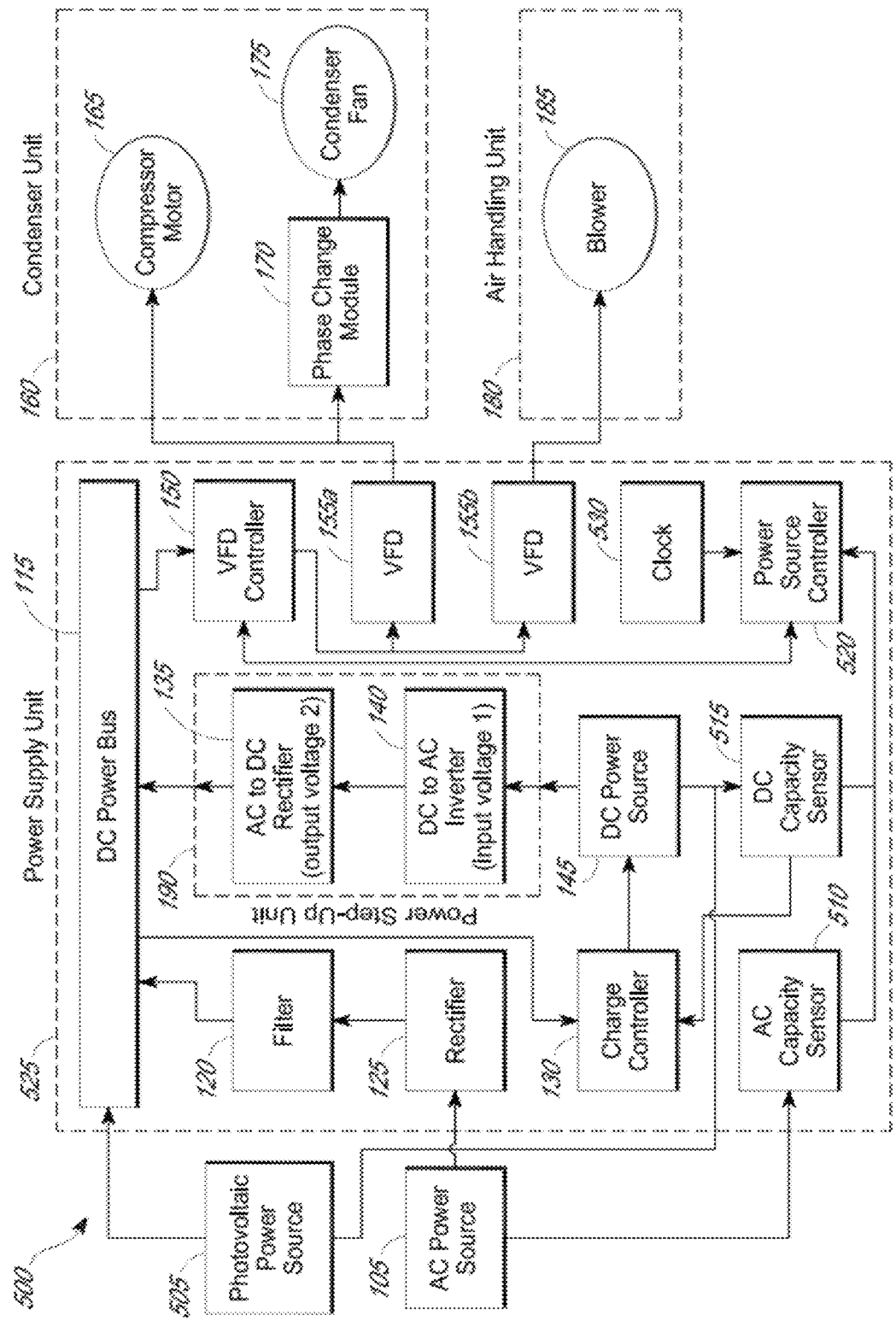
FIG. 5 is a schematic block diagram illustrating an embodiment of an HVAC/R power supply system with a rechargeable DC power source, which utilizes a photovoltaic power source and a power source controller with time-based logic.

FIG. 5 is a schematic block diagram illustrating an embodiment of an HVAC/R power supply system 500 with a rechargeable DC power source, which utilizes a photovoltaic power source 505, a power source controller 520 with time-based logic and a clock 530. FIG. 5 is the system of FIG. 1 augmented with a photovoltaic power source 505, additional sensors 510 and 515, an additional controller 520 and a clock 530.

Photovoltaic power source 505 is an electric device that converts solar radiation such as ambient light to electrical energy. Photovoltaic power generators are typically one or more panels comprising photovoltaic cells that produce a voltage when exposed to solar radiation. Photovoltaic power sources may be portable (e.g. attached to a trailer) or may be permanently installed in the ground or permanently affixed to a shelter or enclosure. Photovoltaic power sources output DC power; however, in some embodiments the photovoltaic power source may be connected to an inverter, which converts the DC output to AC, or may have an integral inverter. Photovoltaic power sources that are connected to an inverter may output single phase or multi-phase AC power at a variety of voltages and wattages. Photovoltaic power sources may have power output (usually rated in wattage) that varies based on the size of the system (e.g. the number of panels) as well as the ambient conditions (e.g. direct versus indirect light). Embodiments of photovoltaic power sources are well known in the art. Photovoltaic power source 505 is electrically connected to the DC power bus 115. In alternative embodiments, the photovoltaic power source 505 may include an integral inverter and be connected instead to rectifier 125 instead. In yet other embodiments, where, for example, the photovoltaic power source 505 has very limited capacity, the photovoltaic power source 505 may be directly connected to charge controller 130 and only serve to provide charge current for DC power source 145.

AC capacity sensor 510 is electrically connected to AC power source 105. The AC capacity sensor may be either the active sensing type, which works by sensing the instant power available at the connection point, or of the passive type, whereby a signal is sent to the AC capacity sensor corresponding to the power output capacity. Additionally, other sensing methods, as are known in the art, may be used. Useful switching and sensing components and circuits are described in U.S. Pat. No. 7,227,749, incorporated herein by reference. The AC capacity sensor 510 is also electrically connected to power source controller 520, which is described in more detail below.

DC capacity sensor 515 is electrically connected to the DC power source 145 and to photovoltaic power source 505. The DC capacity sensor may be either the active sensing type, which works by sensing the instant capacity of the DC power source 145 as well as the instant output of the photovoltaic power source 505, or of the passive type, whereby the DC power source 145 and photovoltaic power source 505 each sends a signal to the DC capacity sensor 515 corresponding to its power output capacity. With DC power sources, such as batteries, the capacity of the power source is generally based on the instant voltage of the power source. For example, as the measured voltage across the battery's terminals decreases, so too does the calculated DC power source capacity. However, other sensing methods, as are known in the art, may be used. Additionally, the DC capacity sensor 515 is electrically connected to the power source controller 520, which is described in more detail below.

Power source controller 520 is electrically connected DC power bus 115, which connects it electrically to the plurality of power sources, such as photovoltaic power source 505 and AC power source 105. Power source controller 520 is also electrically connected to one or more power capacity sensors, such as AC capacity sensor 510 and DC capacity sensor 515. In this embodiment, power source controller 520 is also electrically connected to a clock 530 and a VFD controller 150. The power source controller 520 receives power output capacity data from the sensors connected to it, such as AC capacity sensor 510 and DC capacity sensor 515, as well as power load data from VFD controller 150 and time data from clock 530.

Clock 530 may be software or hardware or combinations thereof that are configured to output time data. In some embodiments, clock 530 outputs time data corresponding to the time of day with no reference to the time of year. In other embodiments, clock 530 outputs both time of day and time of year data (e.g. calendar date). The clock may be standalone hardware, such as a logic circuit designed to output clock data at a fixed interval, or software designed to do the same. While the clock 530 is shown separate of other components of the power supply unit 525 in this embodiment, it may easily be incorporated into hardware and software of other elements of the power supply unit 525, such as the power source controller 520 or the VFD controller 150. Embodiments of clocks and methods for generating time data at fixed intervals are well known in the art.

Power source controller 520 receives capacity, load and time data and calculates a power source distribution based on programmed logic. In simple embodiments, the power source controller 520 might instruct the VFD controller 150 to draw from the AC power source 105 during designated nighttime hours, when photovoltaic power source 505 is not available, and instruct the VFD controller 150 to draw from the photovoltaic power source 505 during designated daytime hours, when it is available. Because nighttime hours and daytime hours change throughout the year, embodiments of clock 530 may additionally provide time of year data to vary the daytime and nighttime hours accordingly. For example, the power source controller 520 may receive data corresponding to a time (e.g. 11:21 AM) and date (Jan. 18, 2011), which indicates that it is daytime and the power source controller 520 should attempt to draw power from the photovoltaic power source 505. The power source controller 520 also receives load data from VFD controller 150 and instructs VFD controller 150 to selectively draw power one or more available power source to optimize system efficiency. For example, if the photovoltaic power source 505 is available and its output is sufficient to meet the instant needs of the HVAC/R components, it would be most efficient and economical to draw power from only that source. However, if the load exceeds the photovoltaic power source's 505 output capacity, the power source controller 520 could supplement the power with either the AC power source 105 or the DC power source 220, so as to not overload the photovoltaic power source 505. Notably, in other embodiments, additional power sources may be available.

The power source controller 520 may also be programmed with costs per power unit per power source during specific times of the day and year, such as cost per kilowatt-hour from AC grid power during "peak" time in the summer. Accordingly, the power source controller 520 may alter the selection of available power sources to avoid more expensive power sources during different times of the day and year. For example, an AC power source, such as grid AC power, may be significantly more expensive during daytime peak hours as compared to photovoltaic power or DC power, or even an alternative AC power source such as a portable AC generator. Notably, while stored DC power has no cost to draw from per se, it does have a cost to charge, which is what would be used in the cost comparison logic. That is, if it costs $0.01 per kilowatt-hour to charge the DC power source 145 at night and that capacity is used the next day, the cost of $0.01 per delivered kilowatt-hour would be used for the cost comparison logic. Additionally, more sophisticated cost modeling may take into account the cost of equipment, such as batteries for DC power source 145, or panels for a photovoltaic power source, over fixed intervals to give a more equal comparison. Additionally, while photovoltaic power may be locally installed, power generation from the photovoltaic power source may be leased from the equipment provider such that consumed power has a real cost, despite the "free" generation of power. Accordingly, during peak hours, the power source controller 520 would elect to draw power from alternate available sources such as photovoltaic power source 505 and DC power source 145 to minimize cost per power unit delivered.

The power source controller may also be programmed to avoid drawing from DC power source 145 during certain times of day, or to selectively charge DC power source 145 only during certain times of day. For example, due to the unavailability of photovoltaic power source 505 during nighttime hours, the power source controller 520 may be programmed to avoid drawing power from the DC power source 145 during evening hours so as to store capacity for the nighttime hours, even if the DC power source is a relatively "cheaper" power source.

In other embodiments, the charge controller 130 may be electrically connected with clock 530 and programmed to only charge the DC power source 145 during certain times a day, such as during nighttime hours. As can be seen by these examples, the addition of time-based logic to the selection of power source can greatly improve the economic efficiency of the system as a whole.

In other embodiments, the power source controller 520 may be incorporated into the VFD controller 150. In such embodiments, the VFD controller 150 is capable of receiving data from AC capacity sensor 510, DC capacity sensor 515 and clock 530 so that it may regulate the power drawn from each power source in accordance with the load required by the HVAC/R system and other logic, such as time-based logic.

The power source controller 520 may comprise a microprocessor or computing system including software and hardware configured to accomplish the aforesaid operations. Examples of controller features and functions are described in U.S. Pat. No. 7,630,856, the relevant portions of which are incorporated herein by reference.

Figure 6:
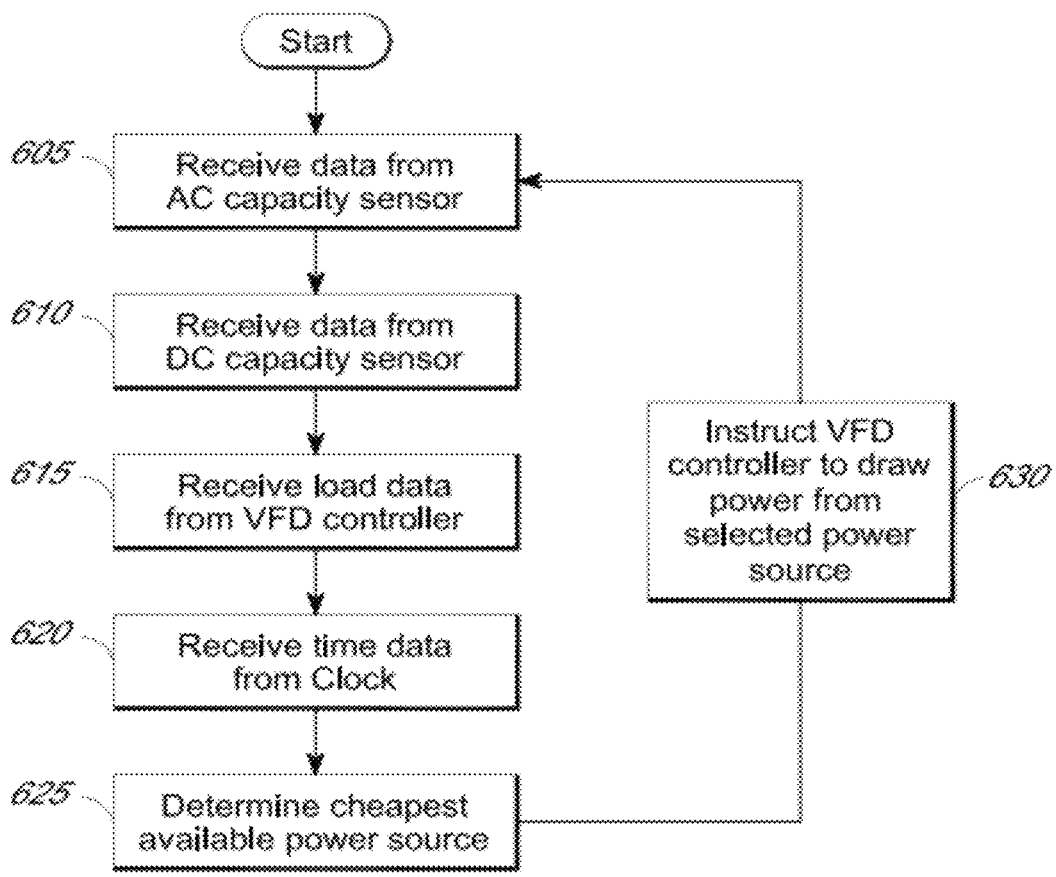
FIG. 6 is a flowchart showing exemplary logic for a controller, such as power source controller with time-based logic.

FIG. 6 is a flowchart showing exemplary logic for a controller, such as power source controller 520 in FIG. 5, which utilizes time-based logic. In the embodiment of FIG. 6, the power source controller is programmed to continually minimize cost per unit of power used by the HVAC/R system. This strategy is not required, but may be preferable where it is desirable to minimize costs.

At state 605, the power source controller receives capacity data from an AC capacity sensor, such as sensor 510 in FIG. 5. Next, at state 610, the power source controller receives capacity data from a DC capacity sensor, such as sensor 515 in FIG. 5. Then at state 615, the power source controller receives load data from a VFD controller, such as controller 150 in FIG. 5. Finally, at state 620, the power source controller receives time data from a clock, such as clock 530 in FIG. 5.

At decision state 625, the power source controller determines the cheapest available power source by, for example, determining which power sources are available based on the capacity of each power source and then comparing the cost per power unit for each available power source. After determining the cheapest available power source, the power source controller instructs the VFD to draw power from the selected power source at state 630. Thereafter, the power source controller loops back into data gathering mode at state 605.

While the above detailed description has shown, described, and pointed out novel features as applied to various embodiments, it will be understood that various omissions, substitutions, and changes in the form and details of the devices and processes illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A heating, ventilation, air conditioning, and refrigeration (HVAC/R) system, comprising:
    an alternating current (AC) power source;
    a DC power source configured to provide power to the HVAC/R system;
    one or more three-phase motors;
    one or more single-phase motors;
    a variable frequency drive (VFD) electrically connected to the AC power source and the DC power source and configured to provide three-phase power to the one or more three-phase motors and single-phase power to the one or more single-phase motors; and
    a controller communicating with the AC power source and the DC power source, wherein the controller further comprises a 24-hour clock and is configured to:
        monitor AC power source capacity, DC power source capacity, and VFD load,
        reduce AC power supplied during selected clock times and when the DC power source capacity is above a predetermined threshold, and
        supplement power to the VFD in response to a determination that the monitored VFD load is greater than the DC power source capacity.

2. The HVAC/R system of claim 1, wherein each of the one or more three-phase motors drives a compressor.

3. The HVAC/R system of claim 2, further comprising an electronic controller linked to the VFD and configured to control the VFD.

4. The HVAC/R system of claim 2, further comprising at least one condenser, at least one evaporator, and piping for directing refrigerant from the compressor to the at least one condenser and from the at least one condenser to the at least one evaporator, and a pulsed operation refrigerant flow control valve connected to the piping for controlling refrigerant flow to the at least one evaporator.

5. The HVAC/R system of claim 4, wherein the pulsed operation refrigerant flow control valve is a mechanical valve.

6. The HVAC/R system of claim 4, wherein the pulsed operation refrigerant flow control valve is an electronic valve.

7. The HVAC/R system of claim 1, wherein the one or more single-phase motors drives a condenser fan.

8. The HVAC/R system of claim 1, further comprising a phase change module connected between the VFD and the one or more single-phase motors, the phase change element comprising a plurality of capacitors in series and at least one capacitor in parallel with the plurality of capacitors in series.

9. The HVAC/R system of claim 1, further comprising a phase change module configured to condition the three-phase power output for input to the one or more single-phase motors.

10. The HVAC/R system of claim 9, wherein the phase change module comprises a plurality of capacitors in series.

11. The HVAC/R system of claim 1, wherein the controller comprises:
    a clock configured to output time data corresponding to one or both of time of day and time of year; and
    logic for calculating a power source distribution based at least partly on the time data and the DC power source capacity, wherein the power source distribution is selected to reduce usage of the AC power source during selected clock times and avoid drawing from the DC power source when the DC power source capacity is insufficient for the HVAC/R system.

12. An air conditioning system, comprising:
    a condenser;
    one or more evaporators;
    an alternating current (AC) power source;
    a direct current (DC) power source configured to selectively provide power to the air conditioning system;
    a variable frequency drive (VFD) electrically connected to the DC power source and configured to provide power to a variable speed condenser motor;
    a pulsed operation refrigerant flow control valve configured to control refrigerant flow to the one or more evaporators; and
    a controller communicating with the AC power source and the DC power source, wherein the controller additionally comprises a 24-hour clock and is configured to:
        monitor AC power capacity, the charge status of the DC power source, and VFD load,
        reduce AC power supplied during selected clock times and when the charge status of the DC power source is above a predetermined threshold, and
        supplement power to the VFD in response to a determination that the monitored VFD load is greater than the charge status of the DC power source.

13. The air conditioning system of claim 12, wherein the pulsed operation refrigerant flow control valve is a mechanical valve.

14. The air conditioning system of claim 12, wherein the pulsed operation refrigerant flow control valve is an electronic valve.

15. The air conditioning system of claim 12, wherein the VFD is configured to also provide single-phase power to a single-phase motor.

16. The air conditioning system of claim 15, wherein the single-phase motor comprises a condenser fan motor.

17. The air conditioning system of claim 12, further comprising an electronic controller linked to the VFD for controlling the VFD.

18. The air conditioning system of claim 17, wherein the electronic controller is also linked to the pulsed operation refrigerant flow control valve for controlling the refrigerant flow within the air conditioning system.

19. A system for powering an HVAC/R system, comprising:
    a direct current (DC) power bus;
    a plurality of power sources;
    a variable frequency drive;
    means for storing DC power electrically connected to the DC power bus;
    means for controlling a variable frequency drive electrically connected to the DC power bus;
    means for selecting from a plurality of power sources and providing electric power to the variable frequency drive, electrically connected to the DC power bus;

means for generating time data electrically connected to the means for selecting from a plurality of power sources and providing electric power to the variable frequency drive;

means for monitoring capacity of the means for storing DC power and a load on the means for controlling a variable frequency drive;

means for reducing AC power supplied during selected clock times and when the DC power source capacity is above a predetermined threshold; and means for supplementing power to the means for controlling the variable frequency drive in response to a determination that the monitored load on the means for controlling the variable frequency drive is greater than the capacity of the means for storing DC power.

20. The system of claim 19, wherein the means for storing DC power is one or more batteries.

21. The system of claim 19, wherein the means for controlling a variable frequency drive is a circuit configured to receive a direct current input and output an alternating current, wherein a frequency of the output alternating current is variable.

22. The system of claim 19, additionally comprising means for controlling the charge of said means for storing DC power.

23. The system of claim 22, wherein said means for controlling the charge is a circuit configured to vary a charge current in response to a charge capacity of the means for storing DC power.

24. The system of claim 19, wherein the means for selecting from a plurality of power sources is a circuit configured to selectively draw power from one or more of the plurality of power sources and direct that power to the variable frequency drive.

25. The system of claim 19, additionally comprising means for sensing the DC capacity of a DC power source.

26. The system of claim 19, wherein at least one of the plurality of power sources is an AC power source.

27. The system of claim 26, additionally comprising means for sensing the alternating current (AC) capacity of the AC power source.

* * * * *